United States Patent [19]

Hegedus et al.

[11] 4,128,506

[45] Dec. 5, 1978

[54] PLATINUM-RHODIUM CATALYST FOR AUTOMOTIVE EMISSION CONTROL

[75] Inventors: Louis Hegedus, Grosse Pointe Woods; Jack C. Summers, Rochester, both of Mich.

[73] Assignee: General Motors Corporation, Detroit, Mich.

[21] Appl. No.: 871,706

[22] Filed: Jan. 23, 1978

[51] Int. Cl.$^2$ .................. B01J 21/04; B01J 23/42; B01J 23/46
[52] U.S. Cl. ........................ 252/466 PT; 423/213.5
[58] Field of Search ............ 252/466 PT; 423/213.5

[56] References Cited

U.S. PATENT DOCUMENTS

| | | | |
|---|---|---|---|
| 4,051,072 | 9/1977 | Bedford et al. | 252/466 PT |
| 4,051,073 | 9/1977 | Hegedus et al. | 252/466 PT |

*Primary Examiner*—W. J. Shine
*Attorney, Agent, or Firm*—Sidney Carter

[57] ABSTRACT

A three-way layered catalyst adapted for use in a system operating at about the stoichiometric air/fuel ratio having significantly improved resistance to poisoning in automotive exhaust comprising an alumina support having a first layer of the catalyst material platinum positioned at the support surface and penetrating the body thereof to a desired depth with an inner second layer of the catalyst material rhodium, the second layer being adjacent to the first layer and penetrating the body of the support, the maximum concentration of platinum being at or near the surface of the support with the minimum concentration of rhodium in the first layer being at or close to the surface and increasing in concentration to a maximum to define the boundary between the first and second layers, the concentrations of platinum and rhodium decreasing inwardly from the boundary with the greater portion of rhodium being in the second layer.

3 Claims, 13 Drawing Figures

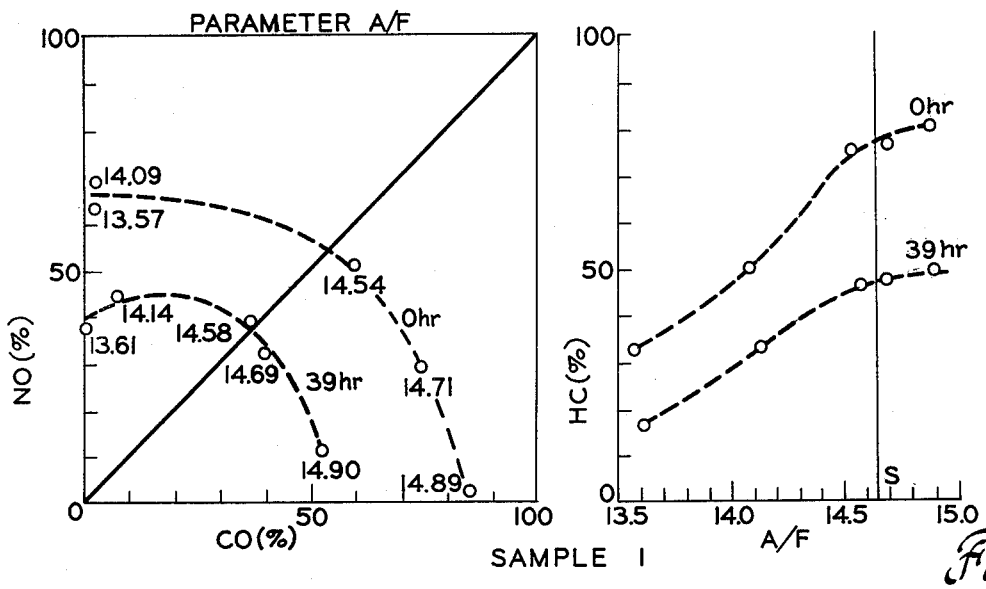
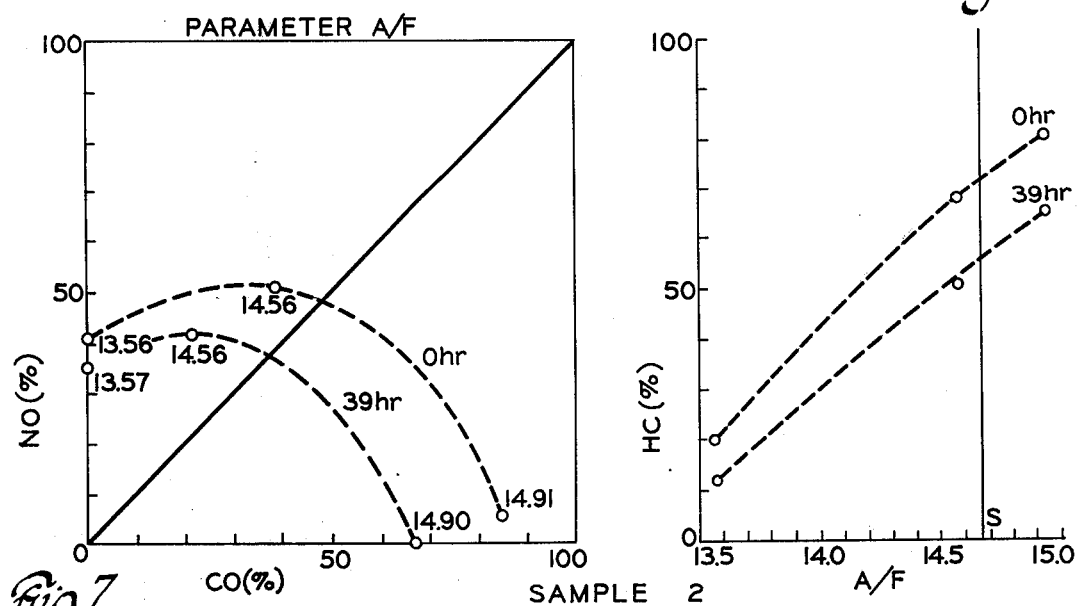
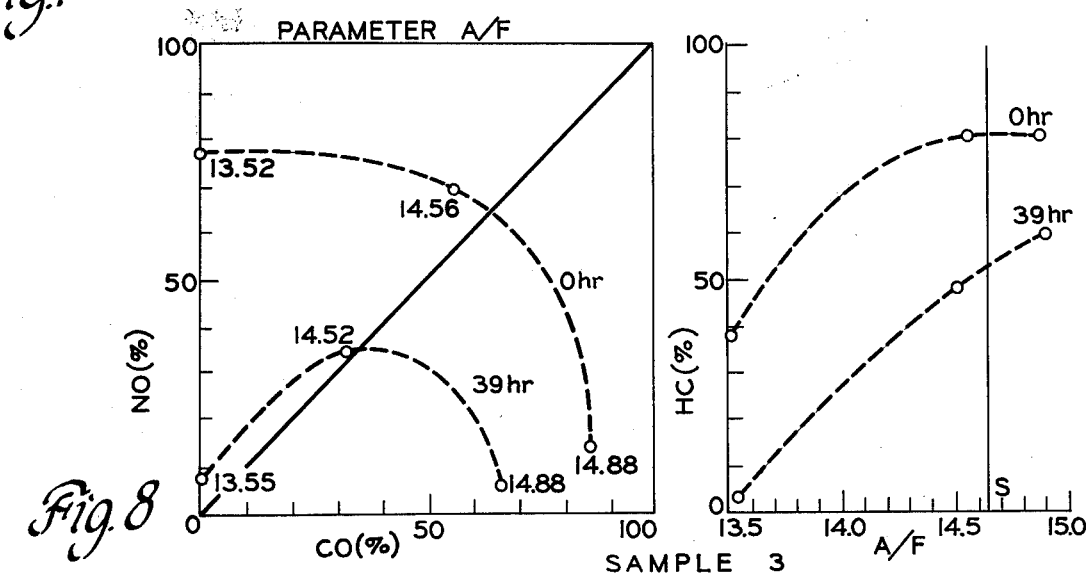

SAMPLE 7

PLATINUM-RHODIUM CATALYST FOR AUTOMOTIVE EMISSION CONTROL

Devices of both the particulate and monolith type are today in use on motor vehicles for the purpose of cleaning up the exhaust emissions to levels required by Federal and State standards and our invention applies to either form. However, as standards require lower levels of unburned hydrocarbons, carbon monoxide, and $NO_x$, a greater demand is placed on the known catalysts for higher conversion efficiencies while still remaining effective over a lifespan as long as 50,000 miles and beyond without deterioration due to poisoning or sintering. This invention relates to improved three-way catalysts having higher catalytic performance over their required lifetime in the operating environment of automotive emissions which include precursor compounds of lead and phosphorus, known catalyst poisons. More particularly, this invention pertains to a platinum and rhodium type catalyst for simultaneously oxidizing unburned hydrocarbons and carbon monoxide and reducing the nitrogen oxides in vehicle exhaust gas, the catalyst being operative in a system in which the air to fuel ratio to the engine is controlled at the stoichiometric point with variations in the mixture narrowly limited on both the rich and lean side of the stoichiometric point.

Applicants have conducted extensive theoretical and laboratory studies, with results verified by engine dynamometer testing, and have developed an improved catalyst having the desired characteristics of higher conversion efficiencies as the result of a greater resistance to poisoning. Applicants' improved catalyst is designated as a layered catalyst. As used herein, any reference to layered catalyst is intended to mean an alumina support or coating, hereinafter referred to as support, having two adjacent layers or bands in which the first or exterior layer contains platinum having good resistance to poisoning by constituents in automotive exhaust gas, the maximum concentration (the term concentration meaning the amount of a catalyst material at any depth of penetration) of platinum being at or close to the surface of the alumina support with the concentration decreasing with increasing penetration into the support, the first layer also containing rhodium having greater susceptibility to poisoning than platinum, the minimum concentration of rhodium in the first layer being at or close to the surface of the alumina support with the concentration thereof increasing with increasing penetration into the support, the boundary between the first and second layers being the depth at which the maximum concentration of rhodium exists, the second layer extending inwardly from the boundary and containing more than half of the total amount of rhodium on the catalyst. The term layer or band is as described above, or, briefly, as regards the first layer, the depth or width of alumina impregnated with and containing the maximum concentration of platinum and extending from the surface to the depth at which the maximum concentration of rhodium exists, the second layer extending inwardly therefrom and containing the greater portion of the rhodium.

Among the catalysts in the prior art are catalysts which include special physical structures. The patent to Michalko U.S. Pat. No. 3,259,589 dated July 5, 1966 discloses a catalyst for treatment of combustible waste gas wherein an organic acid such as citric acid is used in controlled amounts with the solution of catalytically active material in order to produce a finite zone of the catalytic material either on the surface of the alumina support, or a distance below the surface, or throughout the body of the support. The patent to Hoekstra U.S. Pat. No. 3,367,888 dated Feb. 6, 1968 discloses a catalyst having an alumina support on which a zone of platinum is deposited on the outer surface of the support "without any substantial penetration thereof", this being achieved by the use of a sulfurized carboxylic acid. The patent to Hoekstra U.S. Pat. No. 3,360,330 dated Dec. 26, 1967 uses an organic acid such as disclosed by Michalko U.S. Pat. No. 3,259,589 to position platinum a finite distance below the surface of the support followed by impregnation with barium hydroxide and chromic acid to form a barium chromate or dichromate as a coating on the catalyst surface. U.S. Pat. No. 4,006,103 to Meguerian et al. dated Feb. 1, 1977 discloses a monolith catalyst for use in a two stage catalyst system wherein nickel and rhodium are deposited on the support sequentially with nickel deposited first, rhodium being used to promote "strongly the activity of nickel", both metals having similar distribution with the depth of impregnation. U.S. Pat. No. 3,965,040 to Kobylinski et al. dated June 22, 1976 discloses a catalyst for use in a two stage catalyst system wherein platinum or palladium and rhodium or ruthenium are deposited on the support sequentially with platinum or palladium deposited first, both metals having either similar distribution with the depth of impregnation or the ruthenium or rhodium being concentrated on the surface, especially where the impregnation solution also contains a "refractory material, such as a salt of aluminum, titanium, silica, magnesium or zirconium". U.S. Pat. No. 3,898,181 to Barker dated Aug. 5, 1975 discloses a catalyst having two layers in which nickel is first deposited on an inert support followed by a coating of a high surface area support material such as alumina, rhodium being deposited on the high surface area support material, it being desired that the rhodium have its greater concentration "on the exposed surface of the alumina".

As distinguished from the prior art, applicants have developed a layered catalyst having significantly improved conversion levels in a poison (Pb, P) containing automotive exhaust over those of catalysts currently used in automotive emissions control. In the improved catalyst the alumina support is provided with a first layer of platinum positioned on the surface of the support and penetrating the body thereof inwardly from the surface with a second layer of rhodium adjacent to the inner boundary of the first layer and penetrating the body of the support inwardly from such boundary with the greater amount of rhodium positioned inwardly from the first layer in order to protect the rhodium from rapid deterioration and fall-off in conversion performance due to poisoning. Further, while larger amounts of rhodium may be used, our invention enables the use of rhodium in amounts as low as about 0.002% by weight of the catalyst since the greater portion is protected from poisoning by the exterior, platinum-coated layer. This is very significant not only because of decreased cost but since widespread use of greater quantities of rhodium, e.g., 0.018% by weight, in vehicle converters would tend to disrupt the supply and economic balance of the noble metals platinum, palladium and rhodium which are mined in South Africa where the naturally occurring ratio of platinum to rhodium is about 18:1. Further, while small amounts of rhodium are present in the first or exterior layer of platinum, the presence of such small amounts near the surface may be important to suppress the undesirable formation of ammonia in the fresh or relatively fresh catalyst.

It is therefore an object of our invention to provide a layered three-way catalyst for automotive exhaust gas clean-up having platinum as the outermost layer to provide improved conversion efficiency and greater resistance to poisoning. It is a further object of our invention to provide an improved catalyst having a first layer of platinum penetrating the support body from the surface thereof and having a second layer of rhodium adjacent to the first layer and penetrating the support body inwardly from the inner boundary of the first layer, the rhodium being present on the catalyst in an amount as low as about 0.002% by weight of the catalyst, the greater portion of the rhodium being in the second layer.

The foregoing and other objects of our invention will be apparent from the following description and attached drawings in which FIG. 1 shows the increase of depth of penetration of catalyst with increasing weight of HF used as an active site blocking medium;

FIGS. 6 to 12 show the performance curves for Samples 1 to 7, respectively, in the conversion of HC, CO, and NO at different A/F ratios and in the fresh and aged conditions;

Figure 1:
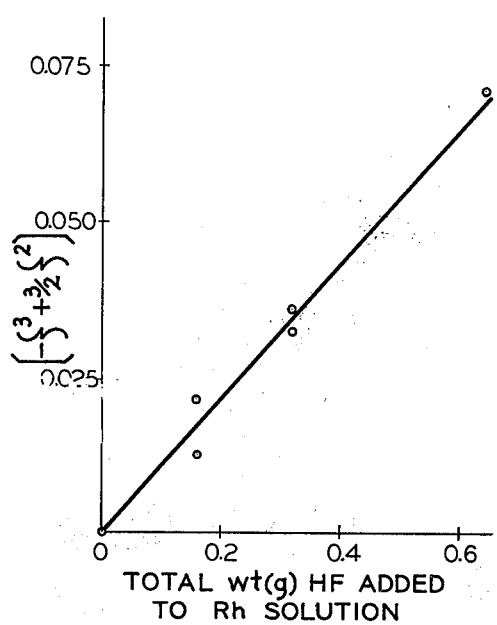

In carrying out our tests we have found that the performance and durability properties of noble metal catalysts are strongly influenced by the relative locations of the catalyst materials. More particularly, four platinum and rhodium containing catalysts were prepared having three different configurations as regards positioning of the catalyst material on the support, and steady state conversion performance tests were run on a dynamometer. The conversion performance tests using the three-way layered catalyst configured in accordance with our invention as described herein showed significantly improved performance as compared with results obtained with both commercial and differently configured catalysts.

The catalysts prepared and tested in accordance with our invention had the following configurations:
(1) Pt layer exterior with Rh layer interior, (Pt/Rh),
(2) Rh layer exterior with Pt layer interior, (Rh/Pt),
(3) Pt and Rh codeposited as a mixture, both extending inwardly with maximum concentrations of each at the surface of the support, (Pt-Rh). These catalysts with their related properties and two commercial catalysts are shown in Table I below.

Table I

Properties and Methods of Preparation of Catalysts Employed

| | | Pt/Rh | Pt/Rh | Pt—Rh | Rh/Pt | Commercial | | Pt |
|---|---|---|---|---|---|---|---|---|
| Sample No. | | 1 | 2 | 3 | 4 | 5 | 6 | 7 |
| Support | | PL 5-22-76 | PL 5-22-76 | PL 5-22-76 | PL 5-22-76 | Rhone-Progil | Rhone-Progil | PL 5-22-76 |
| Pt | toz/car* | 0.037 | 0.033 | 0.036 | 0.028 | 0.042 | 0.047 | 0.049 |
| | w% | 0.046 | 0.041 | 0.045 | 0.036 | 0.045 | 0.047 | 0.062 |
| | begins ($\mu$) | 0 | 0 | 0 | 91 ± 21 | ** | 0 | 0 |
| | ends ($\mu$)[(a)] | 106 ± 24 | 80 ± 30 | 100+ | Center | ** | 87 ± 22 | 235 ± 25 |
| | complex | $H_2PtBr_6$ | $H_2PtBr_6$ | $H_2PtBr_6 + RhCl_3$ | $H_2PtCl_6$ | ? | ? | $H_2PtBr_6$ |
| | prep. method | excess sol. | excess sol. | incip. wet. | incip. wet. | spraying (?) | spraying (?) | excess sol. |
| Rh | toz/car* | 0.0020 | ~0.0016 | ~0.0016 | ~0.0016 | 0.018 | 0.0025 | 0 |
| | w% | 0.0025 | ~0.0020 | ~0.0020 | ~0.0020 | 0.019 | 0.0025 | — |
| | max ($\mu$) | 65 | 88 | 0 | 0 | ** | ** | — |
| | ends ($\mu$) | 200 | 428 | 32 | 30 | ** | ** | — |
| | complex | $(NH_4)_3RhCl_6$ | $RhCl_3$ | $H_2PtBr_6 + RhCl_3$ | $RhCl_3$ | ? | ? | — |
| | blocking agent | HF | HF | none | citric acid | — | — | — |
| | prep. method | incip. wet. | incip. wet. | incip. wet. | incip. wet. | spraying (?) | spraying (?) | — |
| Calcination atmosphere | | air | air | air | air | ? | ? | air |
| Dispersion (%) | | 72 | 99 | 85 | 78 | ? | 69 | 93 |
| Sequence of impregnation | | Rh,Pt | Pt,Rh | coimpregnated | Pt,Rh | ? | ? | Pt |

*Type 260 (4261 $cm^3$) converter
**Based on their reactivity and poisoning behavior, these catalysts most likely contain both Rh and Pt near the outer surface of the pellets.
[(a)]The term "ends" refers to the visually sharp color break in the dark metal band when viewed under microscope after $SnCl_2$ staining.

Table II shows the physical properties of the pellet supports used in the samples shown in Table I. The supports used in Samples other than 5 and 6 were prepared in accordance with the teachings of U.S. Pat. No. 4,051,072 dated Sept. 27, 1977 to Bedford et al. The alumina support used to prepare the catalysts was in the form of 0.32 cm diameter spheres. It should be understood however that the support may be in the form of pellets or granules shaped other than spherical, e.g., cylindrical, such as extrudates, granular, rings, and the like, and also including monolith forms of support. That is, the support may be an all alumina body or a ceramic monolithic body or pellet with an alumina coating. The form and shape of the basic support is not relevant to our invention which, as described, is directed to the catalyst configuration from the standpoint of relative location of layers of different catalyst materials on the support, the alumina body or coating.

Table II

| Properties of Catalyst Supports Employed | | |
|---|---|---|
| | Samples 5 & 6 | All Other Samples |
| Total pore volume ($cm^3$/g) | 0.595 | 0.683 |
| Macro pore volume ($cm^3$/g) | 0.115 | |
| Micro pore volume ($cm^3$/g) | 0.480 | |
| Macro pore radius (Å)* | 4237 | monomodal |
| Micro pore radius (Å)* | 67 | |
| BET surface area ($m^2$/g) | 96 | 112 |
| Pellet density (g/$cm^3$) | 1.135 | 1.037 |
| Effective diffusivity ($cm^2$/sec) | 0.0110 | 0.0126 |
| Nominal pellet radius (cm) | 0.159 | 0.159 |

*integral averaged. Diffusivity is that of an $N_2$ pulse in the He-filled pores of the particular catalyst support, at 40° C. and 1 atm.

As can be seen from Table I, the platinum and rhodium loadings in weight percent, based on total catalyst weight, in each of the catalysts made up except for platinum Sample No. 7 were selected to remain similar in order to achieve results which are fairly comparable to each other and with that of commercial source catalyst No. 6. Commercial Sample No. 5 has an amount of rhodium which is about nine times that of the other samples. As used herein, references to metal, catalytically active materials and the like are intended to comprehend the materials both in the elemental state as well as in the oxide form when used in the context of the prepared catalyst since the materials after calcination exist probably in both states to at least some extent. It is to be noted that the characteristics of the support are not relevant to the invention disclosed herein since layering will function with any of the active aluminas known as catalyst support material. While we prefer to use the optimized types of support disclosed in applicants' U.S. Pat. No. 4,051,073 dated Sept. 27, 1977, and continuation-in-part application Ser. No. 815,791 filed July 15, 1977, our invention is not limited to the use of such optimized supports but is instead usable with supports having a surface area and pore volume, by way of example, less than that specified in our patent.

In making the catalyst Samples Nos. 1 and 2, those having a first or exterior layer of platinum and a second or interior layer of rhodium, impregnation of the support with platinum was achieved by using an excess of the impregnating solution whereas the rhodium was applied using the incipient wetness technique, it being understood that other well known methods for impregnation of the support may be used, e.g., spraying and tumbling. The method for achieving a layered catalyst by use of sequential impregnation with the different catalyst material solutions, one of which also contains an amount of active site blocking acid, e.g., hydrogen fluoride, citric acid, and the like, sufficient to block the active sites on the support to the desired depth is as fully described hereinafter and in our copending application U.S. Ser. No. 815,982 filed July 15, 1977, such disclosure being incorporated herein by reference.

More particularly, in making the catalyst identified as Sample 1 having an exterior Pt layer and an interior Rh layer, 0.0640 grams of the rhodium salt $(NH_4)_3RhCl_6.3H_2O$ together with 0.72 grams HF were dissolved in 560 cc distilled (or deionized) water. This solution was mixed with 1200 cc active alumina beads for impregnation of the alumina by the incipient wetness technique. The impregnated support was then air dried and calcined in ambient air for 4 hours at 550° C.

As shown in FIG. 1 and as discussed in detail in copending application U.S. Ser. No. 815,982, the depth of blocking of active sites by the HF and therefore the penetration of the catalytic materials to form the layers, increases with an increase in the quantity of HF used. The variable $\zeta$ used in FIG. 1 equals the measured depth from the surface divided by the pellet radius. In this instance, Sample 1, the quantity of HF was such as to produce layering wherein the maximum concentration of rhodium occurred at a depth of about 65 $\mu$. Also, as described hereinafter and in our copending application U.S. Ser. No. 815,982, the pH of the impregnating solution affects the depth of penetration of catalyst materials and site blocking, the lower the pH the deeper the penetration, a range of from 2–3 being preferred, a pH as high as 5 being usable.

In determining the location of the rhodium on the pellet, we used ion microprobe mass analysis, IMMA, this technique being highly sensitive to small quantities of rhodium. FIG. 1 demonstrates the relationship between the amount of site blocking agent used and the subsurface location of rhodium for the support used. Thus, the relationship can be established for another support type by a single IMMA measurement of rhodium at a specified amount of site blocking agent.

Figure 2:
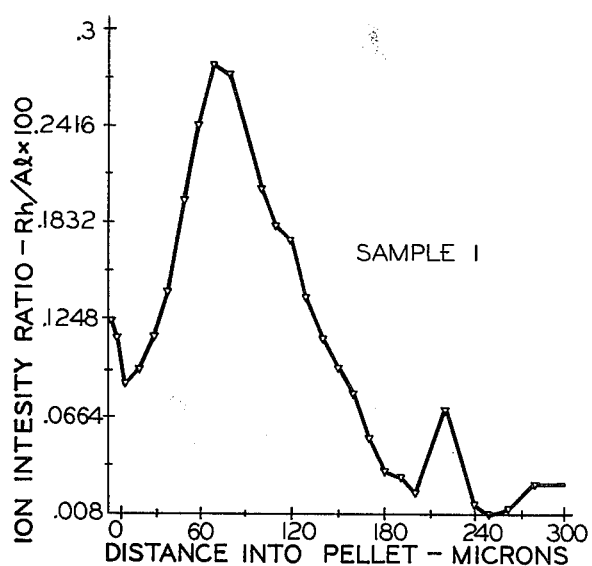
FIGS. 2-5 show the rhodium distribution on the catalyst support for Samples 1 to 4, respectively.

Since the calcining of the impregnated support drives off the HF to unblock the sites and to decompose the rhodium salt to elemental and oxide form, the support is now prepared for the impregnation to form the outer layer of platinum. In this example, 2.254 grams of $H_2PtBr_6.9H_2O$ was dissolved in 2400 cc distilled water to form a solution having a pH of 2.92. The alumina support having an interior rhodium layer was placed in the solution and remained there for a period of 3 hours at ambient temperature after which the excess solution was decanted and the impregnated support air dried and calcined in ambient air for a period of 4 hours at 550° C. to form the catalyst of our invention. The distribution of rhodium on the support in Sample 1 is shown in FIG. 2, the maximum concentration of rhodium being at about 65 $\mu$ below the surface.

Figure 3:
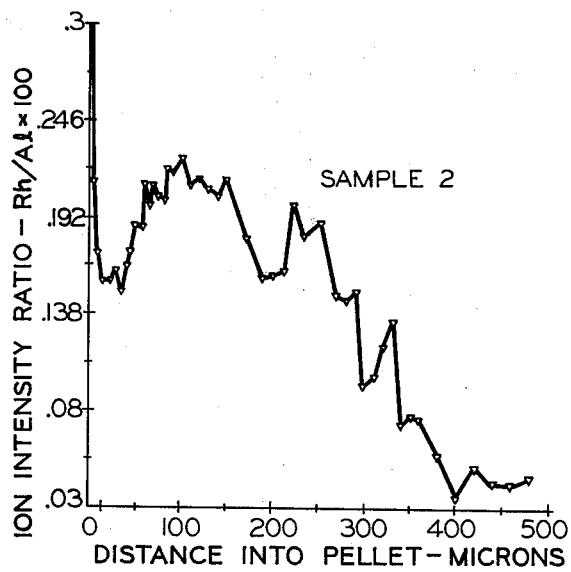

In forming Sample 2, the exterior layer of platinum was first impregnated on the support, the reverse of the procedure followed in preparing Sample 1. A $H_2PtBr_6$ solution (2.333 grams $H_2PtBr_6.9H_2O$ dissolved in 2400 cc distilled $H_2O$ at a pH of 2.72) was allowed to stand in contact with 1200 cc $Al_2O_3$ beads for 3 hours. The solution was then decanted and the catalyst was air dried overnight at room temperature and then air calcined for 4 hours at 550° C. The $Pt/Al_2O_3$ catalyst was next impregnated with a $RhCl_3.3H_2O$ solution (0.0119 grams Rh in 690 cc $H_2O$) containing 115 cc of 2% HF. The pH of the Rh solution was 2.5. The catalyst was air dried overnight and then air calcined for 4 hours at 550° C. The distribution of rhodium on the support is shown in FIG. 3 which places the maximum concentration at about 88 $\mu$ from the surface.

Figure 4:
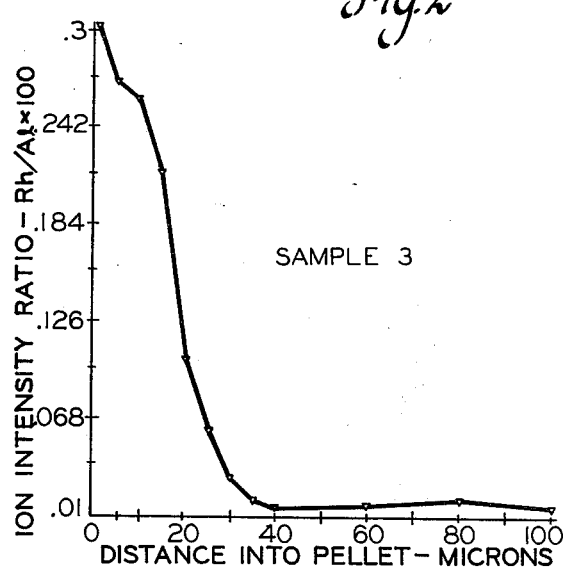

Sample 3 is a co-impregnated catalyst of platinum and rhodium. For its preparation 1.833 grams $H_2PtBr_6.9H_2O$ and 0.0320 grams $RhCl_3.3H_2O$ were dissolved in 560 cc distilled water and were impregnated onto 1200 cc of $Al_2O_3$ beads. The pH was 3.28. The impregnated catalyst was air dried and calcined in ambient air for 4 hours at 535° C. The distribution of rhodium on the support is shown in FIG. 4 and shows the maximum rhodium concentration to be at the edge or surface of the pellet as distinguished from Samples 1 and 2 which used HF to block the active sites at and near the surface to form a layered catalyst.

Figure 5:
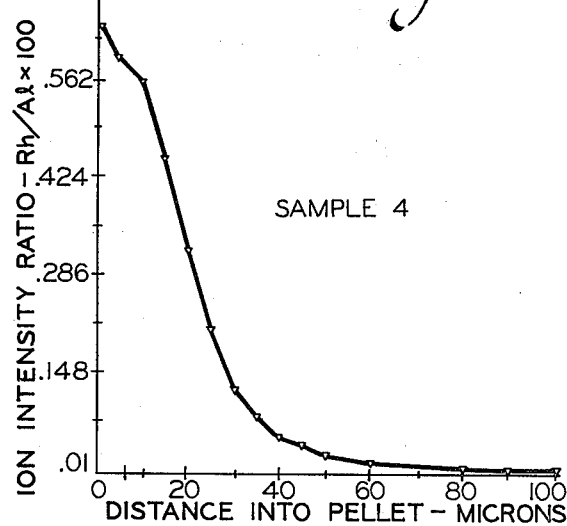
Figure 9:
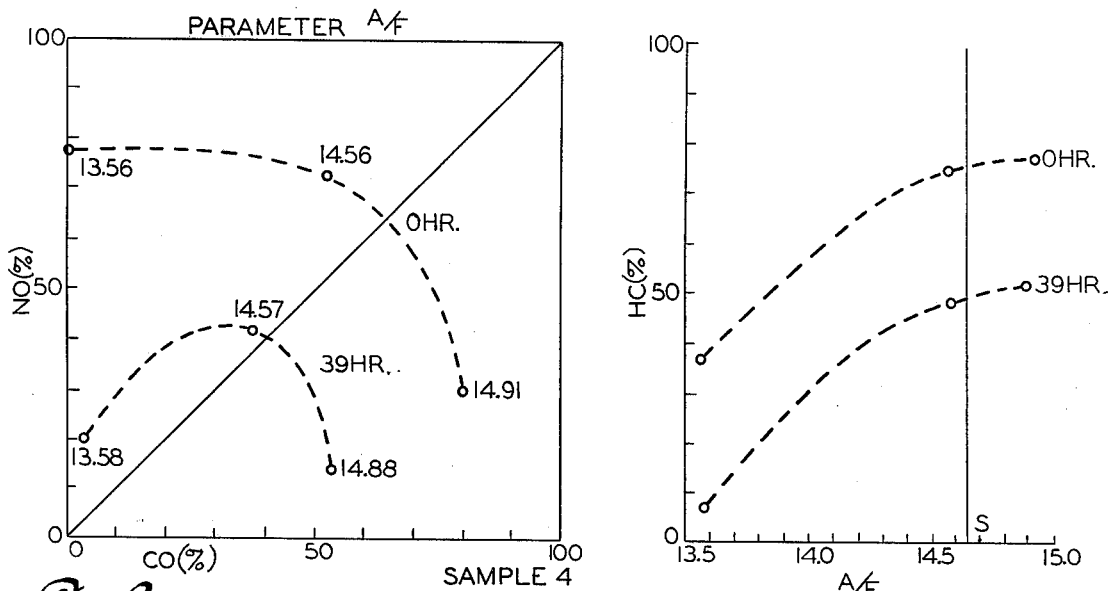

Sample 4 is a layered catalyst in which the layers are reversed from those of Samples 1 and 2, i.e., the exterior layer is rhodium and the interior layer is platinum. As can be seen in FIG. 5, the distribution of rhodium on the support is the same as for the co-impregnated catalyst Sample 3 in that site blocking acid was not used to position the rhodium but was instead used with the platinum. Thus, the maximum concentration of rhodium is at the surface and decreases toward the center. As indicated, site blocking acid being used with the platinum impregnating solution, the platinum has a distribution starting (by $SnCl_2$ visualization) at about 91 ± 21 $\mu$ from the surface and extending to the center. In this instance, the greater portion of the rhodium, i.e., about 80% from a visual integration of the areas under the curve of FIG. 5, is in the outer layer, i.e., from the surface to a depth of about 30 $\mu$.

Sample 4 was prepared by first dissolving 0.855 grams H₂PtCl₆ and 1.053 grams citric acid monohydrate, site blocking acid, in 560 cc distilled water, this being impregnated onto 1200 cc Al₂O₃ at pH 2.18. The catalyst was air dried and calcined in ambient air for 4 hours at 535° C. A solution of 0.0320 grams RhCl₃.3H₂O in 560 cc distilled water was then impregnated on the 1200 cc of Pt/Al₂O₃. The catalyst was air dried and calcined in ambient air for 4 hours at 535° C.

Samples 5 and 6 were obtained from two different commercial sources and are believed to have the metal distribution as noted in Table I.

In view of the relatively small amounts of rhodium present on the catalyst, we have found the Ion Microprobe Mass Analysis technique well suited for the determination of the relative distribution of rhodium as a function of distance into the support. Scanning across the support pellet was accomplished by using a rectangular probe sized 25 $\mu$ by 15 $\mu$. Since both rhodium and aluminum ions are sputtered off the support, the intensity ratio of rhodium to aluminum was measured to eliminate variances in the amount of aluminum due to the variance in surface structure scanned. Also, since at the start of a scan from the support surface inwardly, as was here used, the probe face was partially off the pellet, the measurement of the distance or depth as shown in FIGS. 2-5 must be shifted to the right by the amount indicated by the first relatively sharp break point in direction of the ion intensity curve, this representing the point where significant quantities of aluminum were sputtered from the surface. This amount varies from about 5 to about 12 $\mu$ with a probe face of the noted dimensions, depending on the roughness of surface. Applying this to FIG. 2, the surface of Sample 1 is actually at the point representing about 10 $\mu$ on the distance scale and the maximum rhodium concentration is at about 75 $\mu$ less 10 $\mu$ or at about 65 $\mu$. Further, the data shown in Table I is based on single pellet analysis, it having been shown that such analysis is representative of the data for other pellets in the same batch of catalyst.

As noted above, the platinum for each of the Samples 1-3 is distributed over the depth of the pellet so as to have its maximum concentration at the surface, decreasing concentration occurring with increasing depth of penetration. The penetration of platinum was determined by optical microscopy following the application to the pellet of an aqueous solution of SnCl₂. While the pellet may be soaked in the solution for visualization of the platinum which blackens, we prefer to first cleave the pellet in half for rapid development of coloration. This technique is well known in the art, a usable solution resulting from the addition of 0.4 g SnCl₂.2H₂O to 20 ml water, the solution being boiled with pellets immersed therein.

As described, various platinum and rhodium salts may be used, it being merely necessary that the salts be soluble in water so as to enable impregnation by any of the application techniques known in the art, e.g., spraying, dunking, tumbling. Similarly, drying and calcining treatment may be varied with temperatures and times generally being inversely related. Temperatures as low as 80° C. may be used for drying and as low as 200° C. for calcination. Calcination temperatures may be as high as desired provided the support is not sintered and dispersion of the catalyst is not reduced. Also as indicated in the Sample descriptions above and as set forth in greater detail in our copending application U.S. Ser. No. 815,982, various site blocking acids may be used to control the impregnation of the support with the catalytically active materials, HF being preferred since it has been found to perform as intended regardless of the character of the alumina support. As noted with respect to Samples 1 and 2, the method of impregnation may also be varied as described in detail in application U.S. Ser. No. 815,982.

The amounts of catalytically active material used for Samples 1, 2 and 4 as shown in Table I are approximately those corresponding to the ratios of platinum and rhodium found in the ore as mined. While it is preferred that these materials should be used in such relative amounts, about 0.036% by weight platinum and 0.002% by weight rhodium, it should be understood that the amount of material is not basic to our invention and may be varied as required to achieve the desired level of performance. It should be recognized that amount variations may vary the depth of the layers of catalytically active material. The desired amount of acid required is readily determined by routine sample treatment using the desired method as described in U.S. Ser. No. 815,982 and analysis of layer depths. In preparing the catalysts of our invention, the depth of the first layer, platinum, is preferred to be that to which the poisons will penetrate over the desired lifetime of the catalyst, a depth of from about 50 to 130 microns being indicated in Table I. It should be understood that this depth will vary depending on the concentration of poisons in the emissions gas stream and on the physical properties of the specific support.

Our experiments with platinum and rhodium catalysts showed that proper catalyst design can produce a low rhodium catalyst having overall better performance than a commercial catalyst having nine times as much rhodium. This is shown in FIGS. 6, 7, 10 and 11 and in Table III below.

TABLE III

| | Conversion After 39 Hours In An Accelerated Poisoning Test at High Space Velocity | | | |
|---|---|---|---|---|
| Sample | 1 | 2 | 5 | 6 |
| Rh (wt. %) | 0.0025 | 0.0020 | 0.019 | 0.0025 |
| Pt (wt. %) | 0.046 | 0.041 | 0.045 | 0.047 |
| HC (%)* | 46 | 56 | 33 | 26 |
| CO (%)** | 36 | 37 | 34 | 27 |
| NO$_x$ (%)** | 36 | 37 | 34 | 27 |

*at stoichiometric A/F = 14.65
**at CO/NO crossover point (A/F point where NO and CO conversion are equal, Figures 6–12; found to have good correlation with exhaust analysis by the 1975 Federal Test Procedure).

More particularly, from results of steady state dynamometer testing, a 260 cu. in. converter having 0.033 troy oz. platinum and 0.0016 troy oz. rhodium was shown to outperform a commercial catalyst with 0.042 troy oz. platinum and 0.018 troy oz. rhodium under the same conditions. The tests were conducted using a Chevrolet V-8 engine (5.7 liters), at 1800 rpm, 47 kPa manifold vacuum, no EGR, and an exhaust flow rate of about 100 000 cm³/sec (560° C., 1 atm). For activity testing, the A/F ratio was set to selected values, the system was stabilized, and the CO, NO, and HC conversions determined.

For the aging process, the A/F ratio was continuously changed from 13.7 to 15 (in 20 sec) and back (in 20 sec), by moving the choke plate with an electric motor.

A 1000 cm³ converter was employed which operated at a high space velocity (approximately 130,000 hr⁻¹ at 22° C. and 1 atm). This had the advantage of suppressing the conversions (from near 100% at low space velocities) to a well measurable range, so that differences between catalysts became more pronounced and easier to observe.

The inlet temperature to the converter was between about 560° and 570° C. The exit temperatures varied between about 580° and 630° C., depending upon the degree of conversion over the catalyst which determined the amount of heat generated. The compositions of the fuels employed are shown in Table IV.

Table IV
Poison Content of the Test Fuels Employed

|   |       | Fuel a | 77 cert. |
|---|-------|--------|----------|
| Pb | (g/l) | 0.029 | 0.00045 |
| P  | (g/l) | 0.007 | 0.00005 |
| S  | (g/l) | 0.117 | 0.080   |

Fuel a contained higher P and Pb levels than typical certification fuels. Since the time scale of catalyst poisoning experiments is related to the level of poisons in the feedstream to the catalyst, fuel a was found to approximate 80,000 km (48,000 miles) poison exposure in about 40 hours.

Table V shows the poisoning effects with the identified catalyst Samples.

Table V
Conditions of Aging and Catalyst Analyses After Aging

| Catalyst Sample | Converter (cm$^3$) | Fuel Table I | Duration | Integral Averaged Poison Pick-ups | | Integral Averaged Poison Penetrations | |
|---|---|---|---|---|---|---|---|
| | | | | (P -w %) | Pb - w % | P ($\mu$) | Pb ($\mu$) |
| 1 | 1000 | a | 39 hr | 0.31 | 0.06 | 23 | 3.0 |
| 2 | 1000 | a | 39 hr | 0.20 | 0.25 | 20 | 4.3 |
| 3 | 1000 | a | 39 hr | 0.26 | 0.25 | 16 | 2.7 |
| 5 | 1000 | a | 39 hr | 0.18 | | 11 | 4 |
|   | 4261 | 77 cert. | 80000 km | 0.35 | 0.10 | | |
| 6 | 1000 | a | 39 hr | 0.17 | 0.14 | 8.5 | 3.8 |
| 7 | 1000 | a | 39 hr | 0.21 | 0.15 | 15 | 2.2 |

Figure 10:
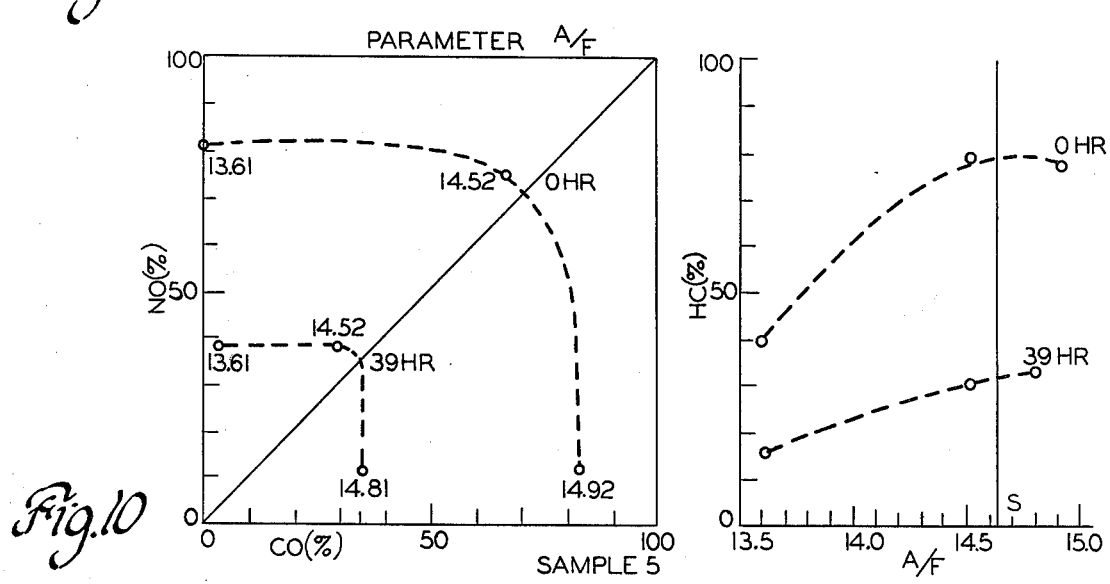
Figure 11:
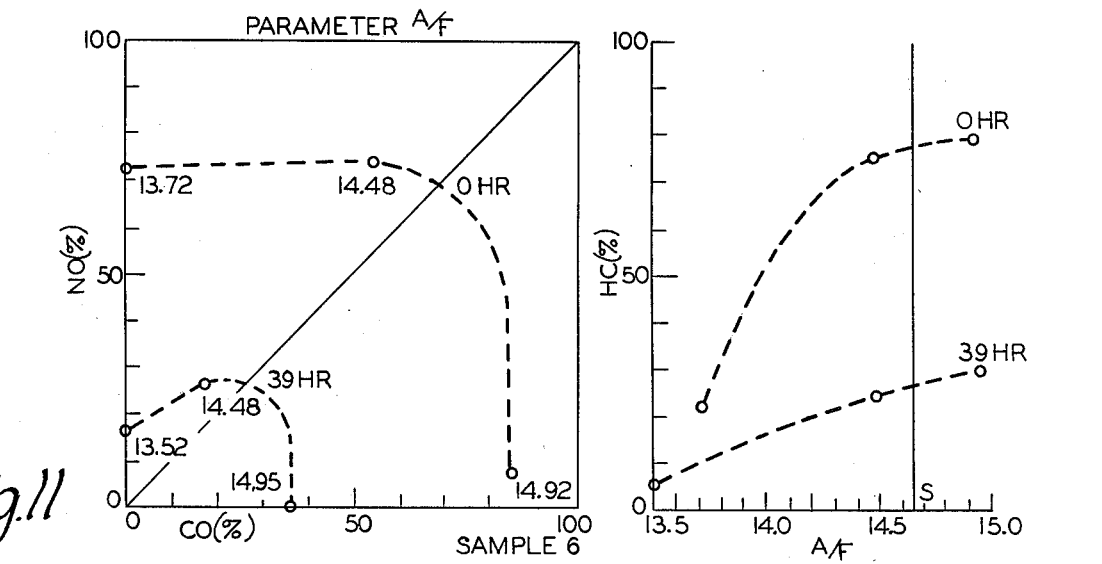
Figure 12:
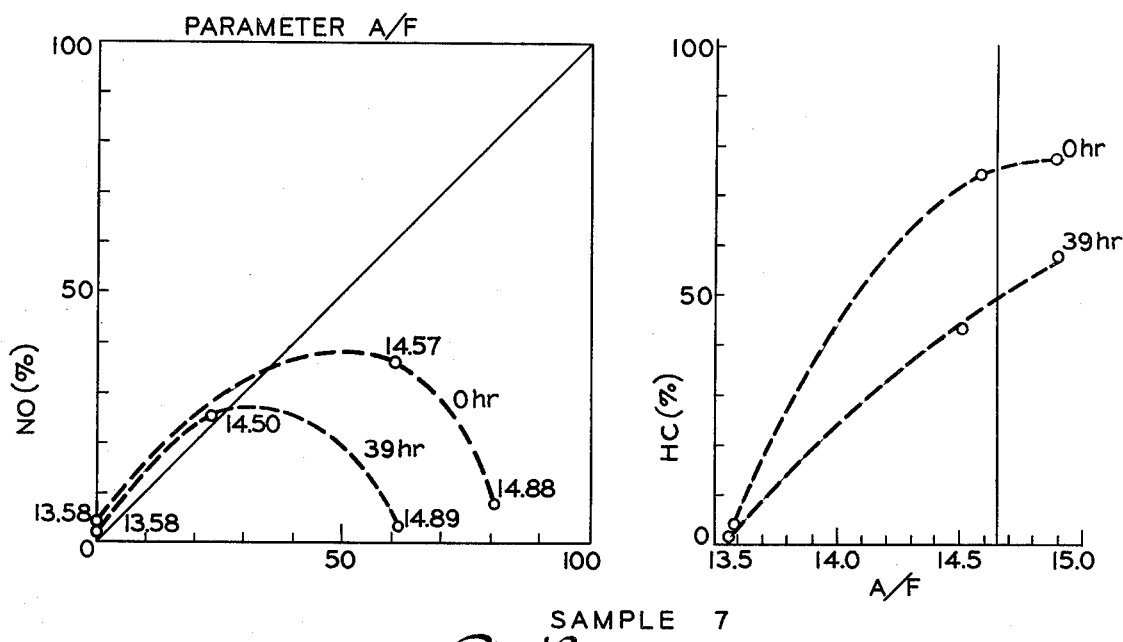
Figure 13:
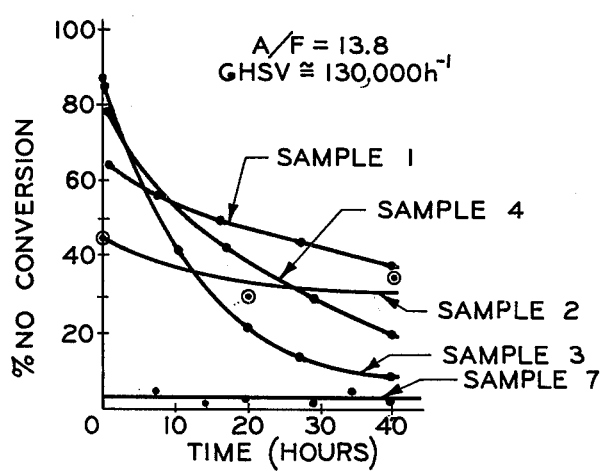
FIG. 13 shows the rate of decline in NO conversion for Samples 1 to 4 and 7 on poisoning with lead and phosphorus.

From an examination of the performance curves and Table III, we prefer the catalyst represented by Sample 2 as producing the most favorable over-all performance over a 48,000 mile (80,000 km) period of operation as represented by about 40 hours of testing. A comparison of FIGS. 6 and 7 shows that Sample 2 is better than Sample 1 on the lean side of stoichiometric as to HC conversion, while they are comparable as to both NO and CO conversion. In this regard, the commercial catalysts which are not layered fall off sharply with respect to CO conversion after reaching about 20 hours of accelerated aging. As might be expected, as shown in FIGS. 10 and 11, the two commercial catalysts, Samples 5 and 6 have the best fresh NO conversion performance, this resulting from the fact that the rhodium is at a maximum at the surface. Also as to be expected, Sample 5 is better than Sample 6 since it has significantly more rhodium than Sample 6. Note that Sample 4, the layered catalyst with rhodium as the exterior or first layer is substantially as good in NO conversion after poisoning as the commercial catalyst Sample 5 which has about nine times the amount of rhodium. While Sample 2, the preferred catalyst, is poorer in NO conversion than that of the Samples 3, 4, 5 and 6, since we are interested in a three-way catalyst, it is the over-all performance that is important and in this regard Sample 2 has the better conversion characteristics as shown in the performance curves and Table III.

As noted at the outset, the catalyst of our invention is intended to operate in a narrow air-to-fuel ratio range about the stoichiometric point, this being about 14.65 A/F. A comparison of conversion performance for Samples 1 to 7 is shown in FIGS. 6 to 12. These drawings plot HC, CO and NO conversion percent at varying A/F ratios and give an insight to performance under actual operating conditions which involve variation of the A/F ratio about the stoichiometric point. As can be seen, the catalysts in accordance with our invention, Samples 1 and 2, outperform the Commercial Catalysts over substantially the entire A/F ratio range. Similar results are shown in FIG. 15 which shows a comparison of NO conversion performance over a period of 40 hours for Samples 1 to 4 at an A/F ratio of 13.8. The over-all performance of Samples 1 and 2 is much better than that of Samples 3 and 4, Sample 3 being similar in configuration of the catalyst materials to that of the commercial Samples 5 and 6, i.e., unlayered with maximum concentration of both platinum and rhodium at the surface.

From the foregoing description and drawings, it has been shown that a layered catalyst having an exterior layer principally platinum and an interior layer with the major portion of the rhodium on the catalyst, results in improved over-all three-way performance when operated close to the stoichiometric point. Other embodiments of our invention may be apparent to those skilled in the art, e.g., positioning both layers closer to the surface, and are within the scope of the claims which follow.

We claim:

1. A three-way platinum/rhodium catalyst adapted for use in a system operating at about the stoichiometric air/fuel ratio of an automotive engine, the catalyst having an alumina support on which there is provided a first layer of platinum which is resistant to poisoning by lead and phosphorous, said platinum being positioned on the surface of said support and penetrating into the body thereof in decreasing concentration with the maximum concentration of platinum being at the surface of the support, a second layer positioned adjacent to said first layer and penetrating into said support with the greater portion of rhodium positioned in said second layer beneath said first layer, rhodium being also present in said first layer with its minimum concentration in said first layer being at or close to said surface and increasing in concentration to a maximum, the depth at said maximum rhodium concentration defining the boundary between said first and second layers, the concentrations of platinum and rhodium decreasing inwardly from said boundary, said first layer of platinum serving to protect the rhodium in said second layer from poisoning and the total amount of rhodium on said catalyst being as low as about 0.002% by weight.

2. A catalyst as set forth in claim 1 wherein the depth of said first layer containing platinum is that to which the poisons in the exhaust gases will penetrate over the desired lifetime of said catalyst.

3. A catalyst as set forth in claim 1 wherein said first layer of platinum has a depth of at least about 65 microns.

* * * * *